United States Patent
Dunwoody et al.

(10) Patent No.: US 10,479,720 B2
(45) Date of Patent: *Nov. 19, 2019

(54) METHODS OF MAKING OPTICAL FIBER WITH REDUCED HYDROGEN SENSITIVITY THAT INCLUDE FIBER REDIRECTION

(71) Applicant: Corning Incorporated, Corning, NY (US)

(72) Inventors: Steven Akin Dunwoody, Castle Hayne, NC (US); Robert Clark Moore, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 391 days.

This patent is subject to a terminal disclaimer.

(21) Appl. No.: 14/338,556

(22) Filed: Jul. 23, 2014

(65) Prior Publication Data

US 2015/0040614 A1 Feb. 12, 2015

Related U.S. Application Data

(60) Provisional application No. 61/863,581, filed on Aug. 8, 2013.

(51) Int. Cl.
*C03B 37/025* (2006.01)
*C03B 37/027* (2006.01)
(Continued)

(52) U.S. Cl.
CPC .... *C03B 37/02718* (2013.01); *C03B 37/0235* (2013.01); *C03B 37/0253* (2013.01);
(Continued)

(58) Field of Classification Search
CPC ........ C03B 37/02727; C03B 37/02718; C03B 37/0253
See application file for complete search history.

(56) References Cited

U.S. PATENT DOCUMENTS 4,396,409 A 8/1983 Bailey et al.
5,236,032 A 8/1993 Nukami et al.
(Continued)

FOREIGN PATENT DOCUMENTS

EP 0321182 6/1989
EP 1205449 A1 5/2002

OTHER PUBLICATIONS

English Translation of CN201480054031.1 First Office Action dated Oct. 10, 2017, China Patent Office.

*Primary Examiner* — John M Hoffmann
(74) *Attorney, Agent, or Firm* — Kevin L. Bray

(57) ABSTRACT

A method of making optical fibers that includes controlled cooling to produce fibers having a low concentration of non-bridging oxygen defects and low sensitivity to hydrogen. The method may include heating a fiber preform above its softening point, drawing a fiber from the heated preform and passing the fiber through two treatment stages. The fiber may enter the first treatment stage at a temperature between 1500° C. and 1700° C., may exit the first treatment stage at a temperature between 1200° C. and 1400° C., and may experience a cooling rate less than 5000° C./s in the first treatment stage. The fiber may enter the second treatment stage downstream from the first treatment stage at a temperature between 1200° C. and 1400° C., may exit the second treatment stage at a temperature between 1000° C. and 1150° C., and may experience a cooling rate between 5000° C./s and 12,000° C./s in the second treatment stage. The method may also include redirecting the fiber with a fluid bearing device or an air-turn device.

23 Claims, 4 Drawing Sheets

(51) Int. Cl.
*C03B 37/023* (2006.01)
*C03B 37/03* (2006.01)

(52) U.S. Cl.
CPC ...... *C03B 37/02727* (2013.01); *C03B 37/032* (2013.01); *C03B 2205/55* (2013.01); *C03B 2205/56* (2013.01); *C03B 2205/60* (2013.01); *Y02P 40/57* (2015.11)

(56) References Cited

U.S. PATENT DOCUMENTS

| | | | |
|---|---|---|---|
| 5,277,730 A * | 1/1994 | Darsey | G02B 6/3801 156/158 |
| 6,565,775 B2 | 5/2003 | Dubois et al. | |
| 6,576,164 B2 | 6/2003 | Guenot et al. | |
| 6,851,282 B2 | 2/2005 | Nagayama et al. | |
| 6,928,840 B1 | 8/2005 | Nagayama et al. | |
| 6,954,572 B2 | 10/2005 | Moridaira et al. | |
| 7,164,831 B2 | 1/2007 | Kurusu et al. | |
| 7,565,820 B2 | 7/2009 | Foster et al. | |
| 7,677,060 B2 | 3/2010 | Oku et al. | |
| 8,020,411 B2 | 9/2011 | Moridaira et al. | |
| 8,074,474 B2 | 12/2011 | Filippov et al. | |
| 9,309,143 B2 * | 4/2016 | Dunwoody | C03B 37/02718 |
| 2001/0006262 A1 | 7/2001 | Dubois et al. | |
| 2003/0086670 A1 | 5/2003 | Moridaira et al. | |
| 2005/0281521 A1 | 12/2005 | Oku et al. | |
| 2006/0204193 A1 | 9/2006 | Okada et al. | |
| 2007/0022786 A1 | 2/2007 | Foster et al. | |
| 2009/0139270 A1 | 6/2009 | Filippov et al. | |
| 2011/0239709 A1 | 10/2011 | Okada | |
| 2011/0274404 A1 | 11/2011 | Okada | |
| 2012/0014654 A1 | 1/2012 | Haruna et al. | |

* cited by examiner

METHODS OF MAKING OPTICAL FIBER WITH REDUCED HYDROGEN SENSITIVITY THAT INCLUDE FIBER REDIRECTION

This application claims the benefit of priority under 35 U.S.C. § 119 of U.S. Provisional Application Ser. No. 61/863,581 filed on Aug. 8, 2013 the content of which is relied upon and incorporated herein by reference in its entirety.

FIELD OF THE DISCLOSURE

This disclosure pertains to methods of making optical fibers. More particularly, this disclosure relates to processing methods that provide optical fibers that exhibit reduced sensitivity to hydrogen. Most particularly, this disclosure relates to methods of making optical fibers that employ controlled cooling protocols to minimize the formation of non-bridging oxygen defects.

BACKGROUND OF THE DISCLOSURE

In the manufacturing of the optical fibers, the optical preforms are heated to temperatures much above the glass softening point and then drawn at large draw down ratios to form optical fibers 125 µm in diameter. Due to the high draw temperatures, large draw down ratios and fast draw speeds, silica bonds can break and defects can be induced in the glass matrix in the optical fiber. Some of these defects are oxidizing defects like the non-bridging oxygen (NBO) defects, which can react with hydrogen even at room temperature to form hydroxyl species. Formation of hydroxyl species in optical fibers is undesirable because hydroxyl species absorb at wavelengths in the telecommunication window and lead to increased transmission losses of optical signals in the telecommunication window. Thus, it is important to develop optical fibers with reduced hydrogen sensitivity for deployment in telecommunication systems.

SUMMARY

The present disclosure provides a method of making optical fibers. The optical fibers have a low concentration of non-bridging oxygen defects and low sensitivity to hydrogen. The method includes a controlled cooling protocol that suppresses the formation of non-bridging oxygen defects or facilitates removal of non-bridging oxygen defects.

The method may include cooling a fiber at an average cooling rate less than 5000° C./s, where the cooling reduces the average temperature of the fiber from a temperature in the range from 1500° C. to 1700° C. to a temperature in the range from 1200° C. to 1400° C.

The method may include cooling a fiber at an average rate greater than 5000° C./s and less than 12,000° C./s, where the cooling reduces the average fiber temperature from a temperature in the range from 1200° C. to 1400° C. to a temperature in the range from 1000° C. to 1175° C.

The method may include heating a fiber preform above its softening point, drawing a fiber from the heated preform and passing the fiber through two treatment stages. The fiber may enter a first treatment stage at a temperature between 1500° C. and 1700° C., may exit the first treatment stage at a temperature between 1200° C. and 1400° C., and may experience an average cooling rate less than 5000° C./s in the first treatment stage. The fiber may enter a second treatment stage downstream from the first treatment stage at a temperature between 1200° C. and 1400° C., may exit the second treatment stage at a temperature between 1000° C. and 1150° C., and may experience an average cooling rate between 5000° C./s and 12,000° C./s in the second treatment stage.

The method may also include redirecting the fiber with a fluid bearing device or an air-turn device. The redirection may redirect the fiber from a substantially vertical direction to a substantially horizontal direction. The redirection may occur after the fiber has exited the second treatment stage or after the surface temperature of the fiber has been cooled to less than 1000° C.

The present disclosure includes:
A method of processing an optical fiber comprising:
providing a fiber, said fiber having an average temperature; and
cooling said fiber at a first rate, said first rate being greater than 5000° C./s and less than 12,000° C./s, said cooling at said first rate reducing said average temperature of said fiber from a first temperature to a second temperature, said first temperature being in the range from 1200° C. to 1400° C. and said second temperature being in the range from 1000° C. to 1175° C.

The present disclosure includes:
A method of cooling an optical fiber during optical fiber manufacturing, comprising the step of drawing the optical fiber from a heated glass source along a first pathway, redirecting the optical fiber to a second pathway, wherein the second pathway is non-collinear with the first pathway, and
cooling said fiber at a first rate, said first rate being greater than 5000° C./s and less than 12,000° C./s, said cooling at said first rate reducing said average temperature of said fiber from a first temperature to a second temperature, said first temperature being in the range from 1200° C. to 1400° C. and said second temperature being in the range from 1000° C. to 1175° C.

The present disclosure includes:
A method of processing an optical fiber comprising:
providing a fiber having a core, said fiber having an average temperature of 1700° C. or greater;
cooling said fiber at a first cooling rate, said first average cooling rate being less than 5000° C./s, said cooling at said first cooling rate reducing said average fiber temperature from a first temperature to a second temperature, said first temperature being in the range from 1500° C. to 1700° C. and said second temperature being in the range from 1200° C. to 1400° C.; and
cooling said fiber at a second cooling rate, said second average cooling rate being greater than 5000° C./s and less than 12,000° C./s, said cooling at said second cooling rate reducing said average temperature of said fiber from a third temperature to a fourth temperature, said third temperature being in the range from 1200° C. to 1400° C. and said fourth temperature being in the range from 1000° C. to 1175° C.

The present disclosure includes:
An apparatus comprising;
a heated glass source, said heated glass source including an optical fiber preform and a drawing furnace;
an optical fiber, said optical fiber formed from said optical fiber preform, said optical fiber having an average temperature;
a first treatment region, said first treatment region being positioned downstream from said heated glass source, said first treatment region configured to cool the average temperature of said fiber from a temperature in the range from 1500° C. to 1700° C. to a temperature in the range from 1200° C. to 1400° C. along a first pathway, said cooling within said first treatment region occurring at an average rate of less than 5000° C./s; and a second treatment region, said second treatment region being positioned downstream from said first treatment region; said second treatment region configured to cool the average temperature of said fiber from a temperature in the range from 1200° C. to 1400° C. to a temperature in the range from 1000° C. to 1175° C. along a second pathway, said cooling in said second treatment region occurring at an average rate of greater than 5000° C./s and less than 12,000° C./s.

The present disclosure further includes:

A fiber having a core, said core having a non-bridging oxygen concentration of less than $6 \times 10^{13}$ cm$^{-3}$.

The present disclosure includes:

A method of processing an optical fiber comprising:

providing a fiber along a first pathway;

cooling said fiber in a first treatment region along said first pathway, said fiber entering said first treatment region at a first average temperature and exiting said first treatment region at a second average temperature, said second average temperature being in the range from 1000° C. to 1500° C.;

cooling said fiber in a second treatment region along said first pathway, said fiber entering said second treatment region at a third average temperature and exiting said second treatment region at a fourth average temperature, said fourth average temperature being in the range from 800° C. to 1200° C.; and redirecting said fiber from said first pathway to a second pathway, said second pathway being non-collinear with said first pathway.

The present disclosure includes:

An apparatus comprising;

a heated glass source, said heated glass source including an optical fiber preform and a drawing furnace;

an optical fiber, said optical fiber formed from said optical fiber preform, said optical fiber having an average temperature greater than 1400° C.;

a first treatment region, said first treatment region being positioned downstream from said heated glass source, said first treatment region configured to cool the average temperature of said fiber along a first pathway to a temperature in the range from 1200° C. to 1400° C.;

a second treatment region, said second treatment region being positioned downstream from said first treatment region; said second treatment region configured to cool the average temperature of said fiber along said first pathway to a temperature in the range from 1000° C. to 1175° C.; and a redirection device, said redirection device positioned downstream from said second treatment region, said redirection device configured to redirect said fiber from said first pathway to a second pathway, said second pathway being non-collinear with said first pathway.

The present disclosure includes:

A method of processing an optical fiber comprising:

providing a fiber along a first pathway;

cooling said fiber in a first treatment region along said first pathway, said fiber entering said first treatment region at a first average temperature and exiting said first treatment region at a second average temperature, said first average temperature being in the range from 1200° C. to 1400° C. and said second average temperature being in the range from 1000° C. to 1075° C.; and redirecting said fiber from said first pathway to a second pathway, said second pathway being non-collinear with said first pathway.

The present disclosure further includes an apparatus having a heated glass source, a first treatment region downstream from the heated glass source, and a second treatment region downstream from the first treatment region. The treatment regions may include furnaces having heated zones set at temperatures that provide the controlled cooling rates disclosed herein.

The treatment regions may include cooling the fiber in a gas ambient. The gas ambient of the first treatment region may include or consist essentially of a gas having an average thermal conductivity over the operable temperature range of the first treatment region that is less than the average thermal conductivity of air over the operable temperature range of the first treatment region. The gas ambient of the second treatment region may include or consist essentially of a gas having an average thermal conductivity over the operable temperature range of the second treatment region that is less than the average thermal conductivity of air over the operable temperature range of the second treatment region. The temperature of the gas surrounding the fiber during cooling in the first treatment region may be between 800° C. and 1200° C. The temperature of the gas surrounding the fiber during cooling in the second treatment region may be between 0° C. and 300° C.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
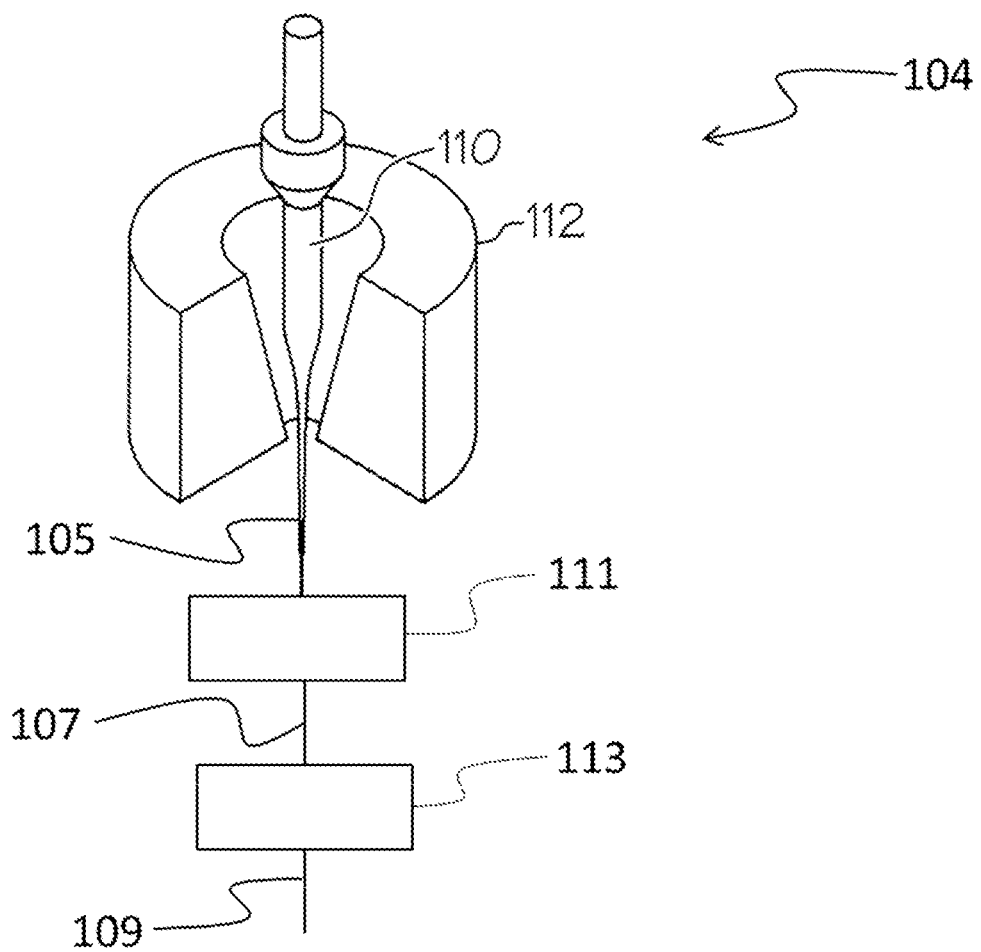
FIG. 1 depicts an optical fiber production system with a glass heating source and two spaced-apart treatment stages.

The present disclosure provides methods of making optical fibers. The methods produce optical fibers that exhibit reduced sensitivity to hydrogen. The optical fibers disclosed herein have fewer defects thereby reducing attenuation of optical signals in the telecommunications window through the fiber when the fiber is exposed to hydrogen. One type of species that absorbs wavelengths in the telecommunication window is the hydroxyl group. Non-bridging oxygen defects are potential precursors for forming the hydroxyl groups in optical fibers. A non-bridging oxygen defect is a dangling oxygen bond that may form from bridging oxygen bonds in silica. Formation of a non-bridging oxygen defect may be schematically depicted as:

 (I)

where "≡" signifies three coordination sites of silicon (usually occupied by oxygen), "." signifies a radical, .Si≡ is a dangling silicon bond (often referred to as an E' defect), and ≡Si–O. is a non-bridging oxygen defect (dangling oxygen bond). Hydroxyl groups may form, even at room temperature, from non-bridging oxygen defects in the presence of hydrogen through the reaction

 (II)

The large draw down ratios and fast draw speeds of conventional fiber manufacturing processes may introduce strains that promote cleavage of Si—O bonds in the silica matrix to form non-bridging oxygen defects through reaction (I). While not wishing to be bound by theory, it is believed that strain-induced cleavage of bridging Si—O bonds is especially problematic at the high temperatures associated with the initial draw. The authors of the present disclosure further believe that strain-induced cleavage of bridging Si—O bonds may be reversible or partially reversible through proper control of the thermal environment experienced by the fiber following the initial draw. The present disclosure provides methods of fiber manufacturing that include controlled cooling protocols to produce optical fibers having fewer non-bridging oxygen defects and a correspondingly reduced tendency to form hydroxyl groups upon hydrogen exposure. The fibers of the present disclosure thus offer higher transmission efficiency in the telecommunication window.

The present methods may include drawing a fiber from a heated glass source, subjecting the fiber to a controlled cooling protocol until the fiber reaches a quench temperature, and quenching the fiber to cool below the quench temperature. The heated glass source may be an optical fiber preform heated in a drawing furnace. The controlled cooling protocol includes cooling at different rates in two treatment regions positioned downstream from the heated glass source. The cooling rate in each treatment region is less than the quench rate, where the quench rate is defined herein to correspond to a cooling rate of at least 12,000° C./s. The quench rate corresponds approximately to the rate of cooling of a fiber having an average fiber temperature of about 1000° C. by natural convection in room temperature air.

In the present method, the fiber may enter a first treatment region with an average temperature in the range from 1500° C. to 1700° C. and may exit the first treatment region with an average fiber temperature in the range from 1000° C. to 1500° C., or in the range from 1200° C. to 1400° C. The residence time of the fiber in the first treatment region may be at least 0.05 sec, or at least 0.10 sec, or at least 0.20 sec, or between 0.05 sec and 0.30 sec. As used herein, cooling rate refers to an average cooling rate, which is defined as the difference between the average temperature of the fiber at the entrance and exit of the treatment region divided by the residence time of the fiber in the treatment region. The average cooling rate in the first treatment region may be less than 5000° C./s, or less than 4000° C./s, or less than 3000° C./s, or less than 2000° C./s, or between 1000° C./s and 4000° C./s, or between 2000° C./s and 3000° C./s.

After exiting the first treatment region, the fiber may enter a second treatment region. The average temperature of the fiber at the entrance of the second treatment region may be in the range from 1200° C. and 1400° C. and the average temperature of the fiber at the exit of the second treatment region may be less than 1175° C., or less than 1150° C., or less than 1125° C., or less than 1100° C., or less than 1075° C., or less than 1050° C., or less than 1025° C., or in the range from range from 1000° C. and 1175° C., or in the range from 1000° C. and 1150° C., or in the range from 1000° C. and 1125° C., or in the range from 1000° C. and 1100° C., or in the range from 1000° C. and 1075° C., or in the range from 800° C. to 1200° C., or in the range from 900° C. to 1200° C. The average cooling rate of the fiber in the second treatment region may be greater than 5000° C./s and less than 12,000° C./s, or greater than 5500° C./s and less than 12,000° C./s, or greater than 6000° C./s and less than 12,000° C./s, or greater than 6500° C./s and less than 12,000° C./s, or greater than 7000° C./s and less than 12,000° C./s, or greater than 7500° C./s and less than 12,000° C./s, or greater than 8000° C./s and less than 12,000° C./s, or greater than 8500° C./s and less than 12,000° C./s, or greater than 9000° C./s and less than 12,000° C./s, or greater than 9500° C./s and less than 12,000° C./s. The average cooling rate of the fiber in the second treatment region may be greater than 5000° C./s and less than 11,000° C./s, or greater than 5500° C./s and less than 11,000° C./s, or greater than 6000° C./s and less than 11,000° C./s, or greater than 6500° C./s and less than 11,000° C./s, or greater than 7000° C./s and less than 11,000° C./s, or greater than 7500° C./s and less than 11,000° C./s, or greater than 8000° C./s and less than 11,000° C./s, or greater than 8500° C./s and less than 11,000° C./s, or greater than 9000° C./s and less than 11,000° C./s, or greater than 9500° C./s and less than 11,000° C./s. The average cooling rate of the fiber in the second treatment region may be greater than 5000° C./s and less than 10,000° C./s, or greater than 5500° C./s and less than 10,000° C./s, or greater than 6000° C./s and less than 10,000° C./s, or greater than 6500° C./s and less than 10,000° C./s, or greater than 7000° C./s and less than 10,000° C./s, or greater than 7500° C./s and less than 10,000° C./s, or greater than 8000° C./s and less than 10,000° C./s, or greater than 8500° C./s and less than 10,000° C./s, or greater than 9000° C./s and less than 10,000° C./s, or greater than 9500° C./s and less than 10,000° C./s.

Upon exiting the second treatment region, the fiber may be further cooled at a different average cooling rate from the average cooling rate in the first treatment region, including rates greater than 5000° C./s, or rates greater than 6000° C./s, or rates greater than 8000° C./s, or quenching at rates of 12,000° C./s or greater. Cooling of the fiber upon exiting the second treatment region may reduce the temperature of the fiber from the temperature of the fiber at the exit of the second treatment region to a temperature below 1000° C., or a temperature below 800° C., or a temperature below 600° C., or a temperature below 400° C., or a temperature below 200° C., or room temperature.

The treatment regions may include cooling the fiber in a gas ambient. The gas ambient of the first treatment region may include or may consist essentially of a gas having an average thermal conductivity over the operable temperature range of the first treatment region that is less than the average thermal conductivity of air over the operable temperature range of the first treatment region. The gas ambient of the second treatment region may include or may consist essentially of a gas having an average thermal conductivity over the operable temperature range of the second treatment region that is less than the average thermal conductivity of air over the operable temperature range of the second treatment region. The temperature of the gas surrounding the fiber during cooling in the first treatment region may be between 800° C. and 1200° C. The temperature of the gas surrounding the fiber during cooling in the second treatment region may be between 0° C. and 300° C.

Fibers prepared by the present methods may have a core and may have a non-bridging oxygen defect concentration in the core at room temperature of less than $6.0 \times 10^{13}$ cm$^{-3}$, or less than $5.5 \times 10^{13}$ cm$^3$, or less than $5.0 \times 10^{13}$ cm$^{-3}$, less than $4.5 \times 10^{13}$ cm$^3$, or less than $4.2 \times 10^{13}$ cm$^{-3}$, or less than $4.0 \times 10^{13}$ cm$^{-3}$, or less than $3.8 \times 10^{13}$ cm$^3$, or less than $3.6 \times 10^{13}$ cm$^{-3}$, or less than $3.4 \times 10^{13}$ cm$^3$, or less than $3.2 \times 10^{13}$ cm$^{-3}$.

Figure 2:
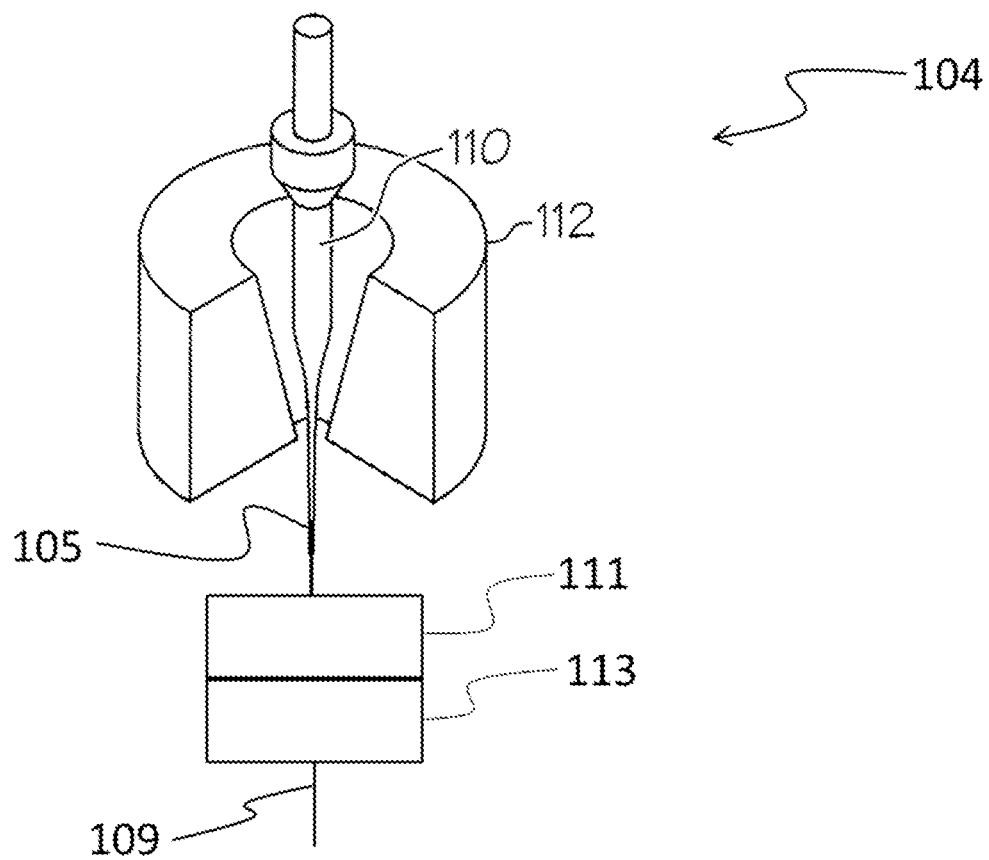
FIG. 2 depicts an optical fiber production system with a glass heating source and two adjacent treatment stages.

Systems for performing the present method are depicted schematically in FIGS. 1 and 2. Production system 104 includes a glass heating source with furnace 112 and optical fiber preform 110. Preform 110 is heated in furnace 112 to a temperature above its softening point and is drawn to form fiber 105, which is directed to first treatment region 111 with an entrance fiber temperature as described hereinabove and is cooled at a rate as described hereinabove to produce fiber 107 having an exit temperature from first treatment region 111 as described hereinabove. Fiber 107 enters second treatment region 113 with an entrance fiber temperature as described hereinabove and is cooled at a rate as described hereinabove to produce fiber 109 having an exit temperature from second treatment region 113 as described hereinabove. The positions of treatment regions 111 and 113 relative to each other and to furnace 112, as well as the size or path length of treatment regions 111 and 113 may be adjusted to conform to the entrance temperature, exit temperature, residence time, and/or cooling rates described hereinabove. FIG. 2 is a variation of FIG. 1 in which treatment regions 111 and 113 are directly adjacent to each other with no intervening space.

The fiber may pass through the first treatment region along a first pathway and cooling of the fiber in the first treatment region may occur along a first pathway. The first pathway may be linear. The fiber may pass through the second treatment region along a second pathway and cooling of the fiber in the second treatment region may occur along a second pathway. The second pathway may be linear. The second pathway may be collinear with the first pathway.

The fiber may pass through the first treatment region and second treatment region along a first pathway and cooling of the fiber in the first and second treatment regions may occur along a first pathway. The fiber may pass along a second pathway after being quenched after the second treatment region. The second pathway may be linear. The second pathway may be collinear with the first pathway.

Treatment regions in accordance with the present disclosure may be furnaces or heated zones adjusted in temperature, size and environment that provide cooling rates and residence times in accordance with the present disclosure for a pre-selected fiber draw speed. The optical fiber may pass through the treatment regions without contacting a solid surface and may cool through radiative or conductive processes. The environment within the treatment region may include a gas, or inert gas, which can serve as a heat transfer medium for receiving heat from the optical fiber as it cools. The identity of the gas may be selected on the basis of thermal conductivity to influence the rate or efficiency of heat transfer from the fiber. The gas employed in first treatment region 111, for example, may be selected to have a lower thermal conductivity than the gas employed in second treatment region 113 to further the objective described hereinabove of having a faster cooling rate in second treatment region 113 than in first treatment region 111. The gas employed in first treatment region 111, for example, may have an average thermal conductivity less than or equal to, or less than, the average thermal conductivity of air over the operable temperature range of first treatment region 111. The gas employed in second treatment region 113 may have an average thermal conductivity greater than, or greater than or equal to, the average thermal conductivity of air over the operable temperature range of second treatment region 113. The temperature of the treatment regions are maintained at a level between room temperature and the average temperature of the fiber.

The temperature employed in first treatment region 111 may be higher than the temperature employed in second treatment region 113. The closer the temperature of the treatment region is to the average temperature of the fiber, the slower is the cooling rate. First treatment region 111 may include a furnace with a heated zone having a temperature between 800° C. and 1500° C., or between 850° C. and 1400° C., or between 900° C. and 1300° C., or between 950° C. and 1200° C.

Processing in second treatment region 113 may include passing the fiber through a gas ambient. The gas ambient may include, or consist essentially of, air or a gas having a thermal conductivity greater than or equal to the thermal conductivity of air. The gas ambient may or may not be heated. The temperature and/or pressure of the gas ambient may be varied to influence the rate of cooling in the second treatment region to achieve a rate of cooling in accordance with the present disclosure. The residence time of the fiber in second treatment region 113 may be adjusted to provide an exit temperature in the range from 1000° C. to 1175° C. or other range described hereinabove before quenching of the fiber commences.

The present method may further include redirecting the optical fiber after exiting the second treatment region. The redirection may include diverting the fiber from one processing pathway to another processing pathway. Drawing of the fiber from the heated glass source (e.g. an optical fiber preform in a draw furnace) may occur in a vertical downward direction and the fiber may be directed through the first treatment region and second treatment region in a substantially vertical direction. Redirection of the fiber upon exit of the second treatment region may enable further cooling or processing in a non-vertical direction, such as a horizontal direction. Redirection of the fiber upon exit of the second treatment region may involve changing the direction of the fiber along its fiber path multiple times. Redirection of the fiber is advantageous because it increases the effective processing path length without the need to increase the vertical space of the production facility.

Redirection of the fiber may be accomplished by one or more redirection devices. Redirection devices include fluid bearing devices and air-turn devices. Fluid bearing devices and air-turn devices preserve the integrity of the fiber by accomplishing redirection of the fiber without making physical contact with the fiber. Instead, redirection is achieved with the force of a pressurized fluid. The fiber passes through a support channel contained within the fluid bearing or air-turn device. The fluid bearing or air-turn device may be circular and the fiber support channel may be formed along or within the circumference of the device. Pressurized fluid supplied from a groove or orifice at the bottom of the fiber support channel provides a force that repels the fiber from the surface of the channel to prevent physical contact. As the fluid or air passes around the fiber and exits the fiber support channel, it creates a pressure distribution that operates to retain the fiber in the center of the support channel via the Bernoulli effect according to principles known in the art. As a result, the fiber conforms to the fiber support channel and is guided in an arcuate direction defined by the fiber support channel to achieve redirection. The direction of the fiber may be changed from substantially vertical to substantially horizontal. The direction of the fiber may be changed by an angle less than 90°, or an angle of 90°, or an angle between 90° and 180°, or an angle of 180°. Illustrative redirection devices are described in U.S. Pat. Nos. 7,737,971 and 8,074,474, and U.S. Patent Application Publication No. 2009/0158779; the disclosures of which are hereby incorporated by reference herein.

When implementing fiber redirection in the present method, the two treatment regions described hereinabove may be placed upstream of a redirection device or upstream of the first of a series of redirection devices. Upstream placement of the treatment regions permits cooling of the fiber in the controlled temperature ranges and at the controlled cooling rates described hereinabove and avoids any cooling that may occur within the redirection device. Cooling rates well above 12,000° C./s, for example, are expected when a fiber passes through an air-turn device because of the convective heat removal that accompanies the high rate of air flow needed to provide the forces necessary to levitate the fiber. As indicated hereinabove, the rate of cooling following exit of the fiber from the last of the two treatment regions may be arbitrary. The low non-bridging oxygen defect concentration afforded by the present disclosure is substantially accomplished through the processing described hereinabove in connection with the two treatment regions. Further cooling below the exit temperature of the last of the two treatment regions is expected to have an insignificant effect on the non-bridging oxygen defect concentration.

Figure 3:
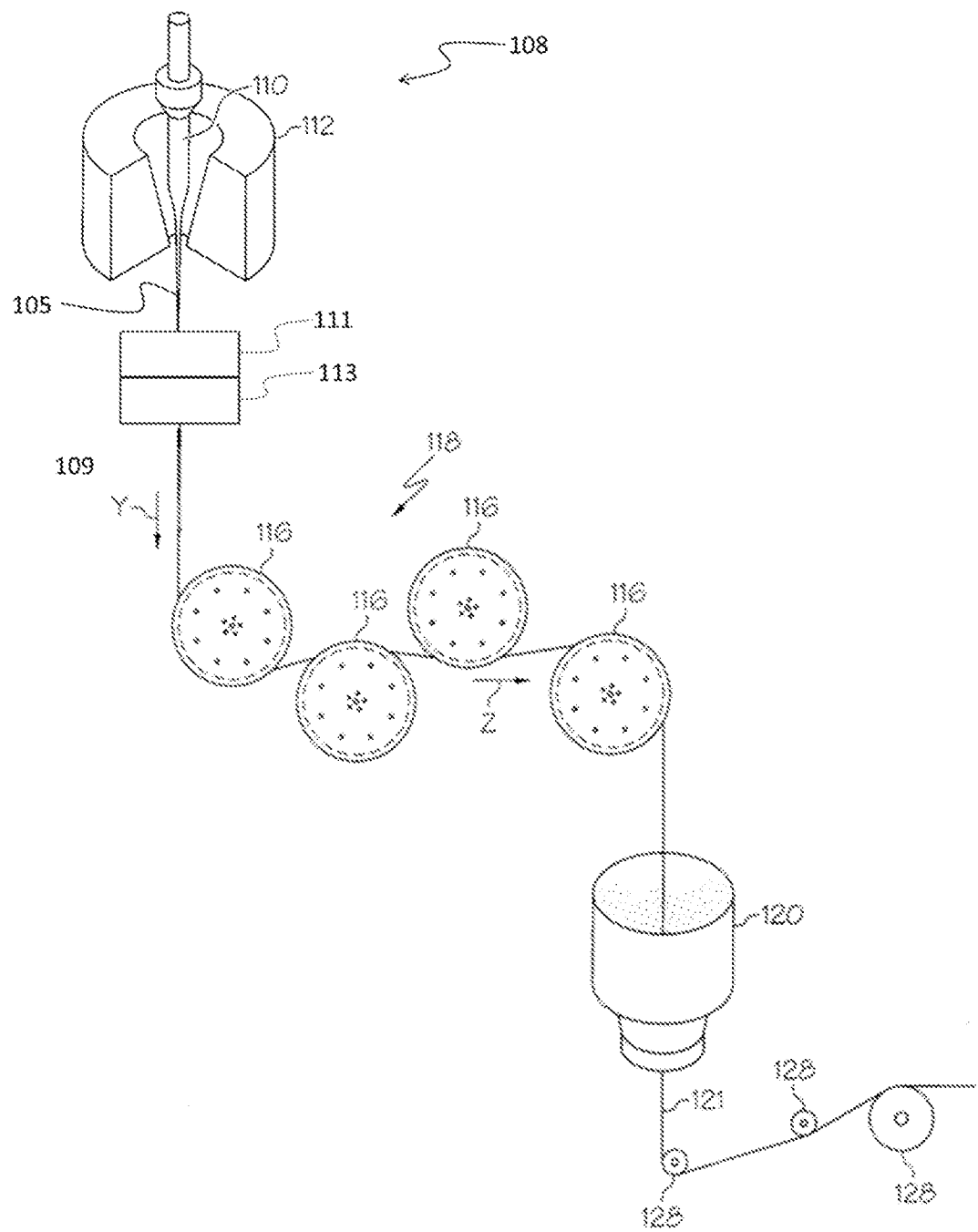
FIG. 3 depicts an optical fiber production system with a glass heating source, two treatment stages, several fiber redirection devices, a coating apparatus and a drawing mechanism.

An apparatus for accomplishing redirection of the fiber is depicted schematically in FIG. 3. Optical fiber production system 108 includes furnace 112 for heating optical fiber preform 110 to a temperature above its softening point and is drawn to form fiber 105, which is directed to first treatment region 111 and second treatment region 113 to form fiber 109 as described hereinabove in connection with FIG. 1. First treatment region 111 and second treatment region 113 are configured to reduce the average temperature of the fiber in accordance with the ranges described hereinabove. The pathway of the fiber through first treatment region 111 is linear and the pathway of the fiber through second treatment region 113 is linear. The linear pathway of the fiber through first treatment region 111 is collinear with the linear pathway of the fiber through second treatment region 113. Fiber 109 is further directed through series 118 of redirection devices 116 and is redirected from a vertical pathway to a more nearly horizontal pathway and back to a more nearly vertical pathway for delivery of the fiber to coating unit 120 to form coated fiber 121. The force to pull the fiber is provided by drawing mechanism 128, which may also be present in the production systems of FIG. 1 and FIG. 2. Redirection devices 116 may be fluid bearing devices or air-turn devices.

Example 1

A series of six fibers was prepared under various treatment conditions to demonstrate the reduction in non-bridging oxygen defects provided by the methods of the present disclosure. Fibers were drawn from a single mode silica preform comprised of germania-doped core. The preform was heated to a draw temperature above 2000° C. in a drawing furnace in a vertical direction and transported to a series of two downstream treatment regions. The first treatment region included a heated zone maintained at 1200° C. The entrance average temperature of the fibers into the first treatment region was ~1580° C. and the average temperature of the fibers exiting the first treatment region was in the range 1300° C.-1330° C. Fiber samples 1, 2, and 3 were cooled in the first treatment region at a rate of about 2500° C./s and had a residence time in the first treatment region of about 0.20 sec. Fiber samples 4, 5, and 6 were cooled in the first treatment region at a rate of about 2850° C./s and had a residence time in the first treatment region of about 0.17 sec. Fibers exiting the first treatment region entered an adjacent second treatment region. In the second treatment region, each fiber was cooled in air. The entrance temperature of each fiber into the second treatment region corresponded closely to its exit temperature from the first treatment region. The cooling rate of each fiber in the second treatment region was about 8000° C./s. The residence time in the second treatment region was varied to adjust the exit temperature of each fiber from the second treatment region. After exiting the second treatment region, each fiber was quenched at a cooling rate of ~25,000° C./s and the fibers were analysed for their core non-bridging oxygen (NBO) defect concentration. The processing conditions and results for each of the fibers are summarized in Table 1.

TABLE 1

Processing Conditions and NBO Defect Concentration

| Fiber Sample | First Treatment Region | | Second Treatment Region | | NBO Defects (cm$^{-3}$) |
|---|---|---|---|---|---|
| | Cooling Rate (° C./s) | Residence Time (s) | Cooling Rate (° C./s) | Exit Temp (° C.) | |
| 1 | 2500 | 0.20 | 8000 | 1013 | 3.13 × 10$^{13}$ |
| 2 | 2500 | 0.20 | 8000 | 1058 | 3.15 × 10$^{13}$ |
| 3 | 2500 | 0.20 | 8000 | 1071 | 3.21 × 10$^{13}$ |
| 4 | 2850 | 0.17 | 8000 | 1127 | 4.31 × 10$^{13}$ |
| 5 | 2850 | 0.17 | 8000 | 1170 | 4.61 × 10$^{13}$ |
| 6 | 2850 | 0.17 | 8000 | 1183 | 5.15 × 10$^{13}$ |

The results indicate that controlled cooling using two treatment regions in accordance with the present disclosure consistently yields fibers with cores having a non-bridging oxygen defect concentration of less than 6×10$^{13}$ cm$^{-3}$. For comparison purposes, fibers prepared from conventional processes lack the controlled cooling of the present disclosure and typically have a non-bridging oxygen defect concentration of 8×10$^{13}$ cm$^{-3}$ or greater in the core.

The results further indicate that the exit temperature of the fiber from the second treatment region has a significant influence on the concentration of non-bridging oxygen defects. The further the exit temperature from the second treatment region is below 1200° C., the lower is the non-bridging oxygen defect concentration. The non-bridging oxygen defect concentration appears to level off as the exit temperature from the second treatment region approaches 1000° C. The results indicate that controlled cooling in accordance with the present disclosure enables a significant reduction in the concentration of non-bridging oxygen defects. Among other unexpected findings, the results suggest that controlled cooling in the temperature window (e.g. 1000° C.-1200° C.) of the second treatment region is important in further lowering the concentration of non-bridging oxygen defects that may be achieved by controlled cooling in the temperature range of 1200 to 1500° C. The importance of controlling cooling conditions within this temperature window for reducing non-bridging oxygen defect concentration has not heretofore been recognized by those of skill in the art.

Example 2

Figure 4:
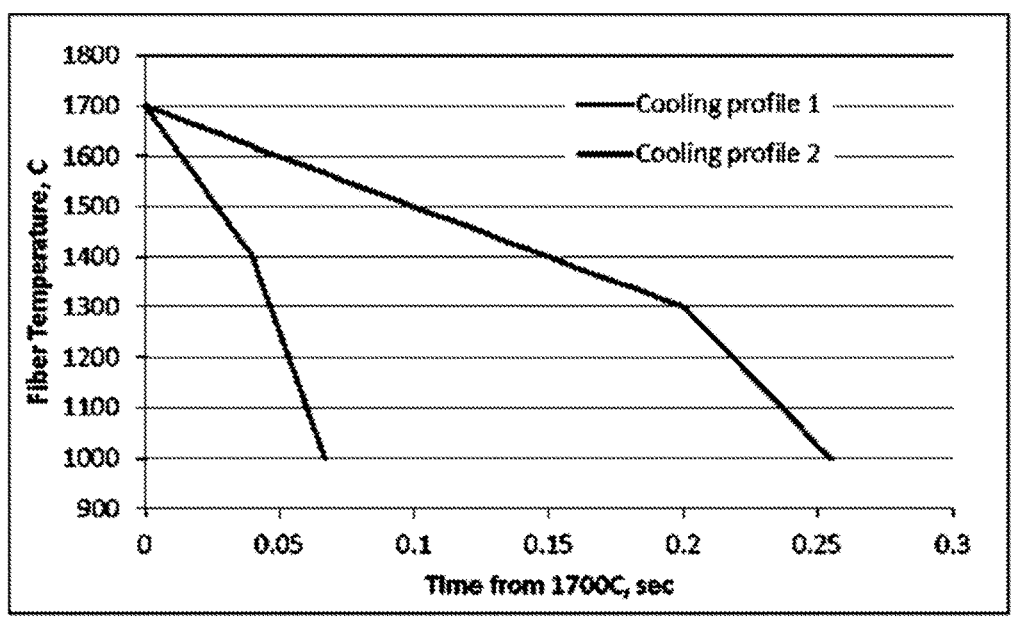
FIG. 4 depicts two fiber cooling profiles.

In this example, fibers prepared using different cooling profiles are compared. The fibers were drawn in separate trials from the same apparatus and subjected to one of the two cooling profiles illustrated in FIG. 4. Each cooling profile in FIG. 4 shows the fiber surface temperature as a function of time, where a time of zero corresponds to the point in time at which the fiber has an average temperature of 1700° C. Cooling profile 1 represents a profile consistent with prior art fiber processing conditions, while cooling profile 2 represents a profile in accordance with the present disclosure.

For cooling profile 1, the fibers entered the first treatment region with an average fiber temperature of 1700° C., were cooled at an average rate of 7500° C./s, and exited the first treatment region with an average fiber temperature of 1400° C. The fibers then entered a second treatment region with an average fiber temperature of 1400° C., were cooled at an average rate of 15,000° C./s, and exited the second treatment region with an average fiber temperature of 1000° C. After exiting the second treatment region, the fibers were quenched at a cooling rate of ~25000° C./sec.

For cooling profile 2, the fibers entered the first treatment region with an average fiber temperature of 1700° C., were cooled at an average rate of 2000° C./s, and exited the first treatment region with a surface temperature of 1300° C. The fibers then entered a second treatment region with an average fiber temperature of 1300° C., were cooled at an average rate of 5,500° C./s, and exited the second treatment region with an average fiber temperature of 1000° C. After exiting the second treatment region, the fibers were quenched at a cooling rate of ~25000° C./sec.

Measurements of the non-bridging oxygen defect concentration of fibers prepared using the two cooling profiles were completed. The results indicated that fibers prepared using cooling profile 1 had a significantly higher concentration of non-bridging oxygen defects than fibers prepared using cooling profile.

Example 3

In this example, the effect of the temperature of the heated region of the first treatment region on the non-bridging oxygen defect concentration of a series of seven fibers was considered. The fibers were prepared from a common optical fiber preform in a common drawing apparatus that included a drawing furnace, a first treatment region downstream from the drawing furnace, a second treatment region downstream from the first treatment region, and drawing mechanism. The second treatment region was directly adjacent the first treatment region and consisted of cooling the fiber in air. After exiting the first treatment region, each fiber was cooled in air in the second treatment region for the same residence time and then quenched. After quenching, the non-bridging oxygen defect concentration was measured.

The temperature of the heated zone of the first treatment region impacts the fiber temperature-time history in the first treatment region as well as the exit temperature of the fiber from the first treatment region. The temperature-time history and exit temperature at the end of the first treatment region not only influences the healing of the non-bridging defects in the first treatment region, but also the healing of non-bridging defects in the second treatment region due to the temperature-time history in the second treatment region as well as the exit temperature of the second treatment region, which was also the temperature at which the fiber was quenched in this example. Except for the temperature of the first treatment region, the processing conditions were identical for each of the fiber samples of this example. The fiber samples considered in this example are numbered 7-13.

The first heat treatment region included a heated zone. The temperature employed in the heated zone of the first treatment region, the average fiber temperature at the exit of the first and second treatment regions, and the concentration of non-bridging oxygen defects (NBO defects) in fiber samples 7-13 are summarized in Table 2.

TABLE 2

| | Non-Bridging Oxygen Defect Concentration | | | |
|---|---|---|---|---|
| Fiber Sample | Heated Zone Temp - First Treatment Region (° C.) | Exit Temp - First Treatment Region (° C.) | Exit Temp - Second Treatment Region (° C.) | NBO Defects (cm$^{-3}$) |
| 7 | 885 | 1248 | 1028 | $5.41 \times 10^{13}$ |
| 8 | 1000 | 1316 | 1085 | $5.21 \times 10^{13}$ |
| 9 | 1030 | 1333 | 1101 | $5.07 \times 10^{13}$ |
| 10 | 1060 | 1351 | 1116 | $5.16 \times 10^{13}$ |
| 11 | 1100 | 1374 | 1136 | $5.27 \times 10^{13}$ |
| 12 | 1130 | 1392 | 1151 | $5.24 \times 10^{13}$ |
| 13 | 1200 | 1397 | 1191 | $5.34 \times 10^{13}$ |

The results indicate that for common residence time and the gas temperature conditions in the second treatment region, the temperature employed in the heated zone of the first treatment region influenced the concentration of non-bridging oxygen defects. The heated zone temperature impacts the fiber temperature-time history in the first treatment region and also the exit temperature at the end of the first treatment region. The temperature-time history and exit temperature at the end of the first treatment region not only influences the healing of the non-bridging defects in the first treatment region, but also the healing of non-bridging defects in the second treatment region due to the temperature-time history in the second treatment region as well as the exit temperature of the second treatment region, which is also the temperature at which the fiber samples were quenched. The non-bridging oxygen concentration was observed to decrease as the temperature employed in the first treatment region increased from 885° C. to 1030° C. and to increase with further increases in temperature up to 1200° C. The existence of a minimum in the non-bridging oxygen defect concentration with variation in the temperature employed in the first treatment region demonstrates a synergy between the conditions (temperatures, cooling rates, and/or residence times) of the first and second treatment regions. If the temperature employed in the heated zone of the first treatment region were the only factor influencing the concentration of non-bridging oxygen defects, the trend in non-bridging oxygen defect concentration would be monotonic instead of displaying a minimum. This example illustrates the influence of the conditions of the second treatment region on the concentration of non-bridging oxygen defects. Coordination of the conditions employed in the second treatment region with the conditions employed in the first treatment region allows for minimization of the non-bridging oxygen defect concentration.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of processing an optical fiber comprising:
cooling an optical fiber from a first average temperature to a second average temperature at a first cooling rate in a first furnace along a first pathway, said first furnace having a first inlet and a first outlet, said fiber having said first average temperature at said first inlet and said second average temperature at said first outlet, said first average temperature being in the range from 1500° C. to 1700° C., said second average temperature being in the range from 1000° C. to 1500° C., said first cooling rate being less than 5000° C./s; and
cooling said fiber from a third average temperature to a fourth average temperature at a second cooling rate in a second furnace along said first pathway, said second furnace having a second inlet and a second outlet, said fiber having said third average temperature at said second inlet and said fourth average temperature at said second outlet, said third average temperature being less than or equal to said second average temperature, said fourth average temperature being in the range from 1000° C. to 1175° C., said second cooling rate being greater than 5000° C./s and less than 12,000° C./s.

2. The method of claim 1, wherein said third average temperature is in the range from 1200° C. to 1400° C.

3. The method of claim 1, wherein said first cooling rate is between 1000° C./s and 4000° C./s.

4. The method of claim 1, wherein said cooling from said first average temperature to said second average temperature requires a time of at least 0.05 sec.

5. The method of claim 1, wherein said cooling from said first average temperature to said second average temperature requires a time between 0.05 sec and 0.3 sec.

6. The method of claim 1, wherein said cooling at said first cooling rate includes passing said fiber through a heated region, said heated region having a temperature between 800° C. and 1500° C.

7. The method of claim 1, wherein said second cooling rate is greater than 6000° C./s and less than 11,000° C./s.

8. The method of claim 1, wherein said second cooling rate is greater than 5800° C./s.

9. The method of claim 1, wherein said fourth average temperature is in the range from 1000° C. to 1100° C.

10. The method of claim 1, wherein said cooling at said first cooling rate occurs in a first gas ambient, said first gas ambient consisting essentially of a gas having an average thermal conductivity less than an average thermal conductivity of air over the temperature range from said first average temperature to said second average temperature.

11. The method of claim 1, wherein said cooling at said second cooling rate occurs in a gas ambient, said gas ambient consisting essentially of a gas having an average thermal conductivity less than or equal to an average thermal conductivity of air over the temperature range from said third average temperature to said fourth average temperature.

12. The method of claim 1, further comprising cooling said fiber from said fourth average temperature to a temperature below 1000° C. at a third cooling rate, said third cooling rate exceeding 5000° C./s.

13. The method of claim 12, wherein said third cooling rate exceeds 12,000° C./s.

14. The method of claim 1, wherein said fiber includes a core, said method further comprising cooling said fiber to room temperature, said room temperature fiber having a non-bridging oxygen concentration in said core of less than $6 \times 10^{13}$ cm$^{-3}$.

15. The method of claim 1, wherein said providing fiber includes forming said fiber, said forming including drawing said fiber from a heated glass source.

16. The method of claim 1, wherein said second average temperature is in the range from 1200° C. 1400° C.

17. The method of claim 1, further comprising:
redirecting said fiber from said first pathway to a second pathway, said redirecting said fiber including cooling said fiber at a rate greater than 12000° C./s and diverting said fiber from said first pathway to said second pathway with a fluid bearing device or an air-turn device, said second pathway being non-collinear with said first pathway.

18. The method of claim 17, wherein said first pathway is linear and said second pathway is linear.

19. The method of claim 17, said fiber entering said fluid bearing device or said air-turn device at a temperature less than 1000° C.

20. The method of claim 17, said fluid bearing device or said air-turn device having a support channel for receiving said fiber, said fluid bearing device or said air-turn device diverting said fiber without said fiber making physical contact with said support channel.

21. The method of claim 17, said fluid bearing device or said air-turn device having a support channel for receiving said fiber, said fluid bearing device or said air-turn device diverting said fiber with a pressurized fluid, said pressurized fluid providing a force to said fiber, said force repelling said fiber to prevent physical contact of said fiber with said support channel of said fluid bearing device or said air-turn device.

22. The method of claim 17, further comprising:
coating said fiber after said redirecting of said fiber.

23. The method of claim 22, wherein said coating occurs along said second pathway.

* * * * *